US012685245B2

(12) United States Patent　　(10) Patent No.:　US 12,685,245 B2

Schroeder　　(45) Date of Patent:　Jul. 21, 2026

---

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 437 days.

(21) Appl. No.: 18/143,847

(22) Filed: May 5, 2023

(65) Prior Publication Data

US 2024/0365696 A1　　Nov. 7, 2024

(51) Int. Cl.
| | |
|---|---|
| *A01B 79/00* | (2006.01) |
| *A01B 35/16* | (2006.01) |
| *A01B 63/00* | (2006.01) |
| *G06T 7/60* | (2017.01) |
| *G06V 10/764* | (2022.01) |
| *G06V 20/56* | (2022.01) |

(52) U.S. Cl.
CPC ............ *A01B 79/005* (2013.01); *A01B 35/16* (2013.01); *A01B 63/008* (2013.01); *G06T 7/60* (2013.01); *G06V 10/764* (2022.01); *G06V 20/56* (2022.01); *G06T 2207/30188* (2013.01); *G06T 2207/30252* (2013.01)

(58) Field of Classification Search
CPC ..... A01B 79/005; A01B 35/16; A01B 63/008; G06V 10/764; G06V 20/56; G06T 7/60; G06T 2207/30188; G06T 2207/30252
See application file for complete search history.

(56) References Cited

U.S. PATENT DOCUMENTS

| | | |
|---|---|---|
| 5,442,552 A | 8/1995 | Slaughter et al. |
| 10,255,670 B1 | 4/2019 | Wu et al. |
| 10,462,957 B2 | 11/2019 | Clement et al. |
| 11,445,656 B2 | 9/2022 | Smith |

(Continued)

FOREIGN PATENT DOCUMENTS

| | | |
|---|---|---|
| CN | 201222876 U | 4/2009 |
| CN | 201222876 Y | 4/2009 |

(Continued)

*Primary Examiner* — Hunter B Lonsberry
*Assistant Examiner* — Besufekad Lemma Tessema
(74) *Attorney, Agent, or Firm* — Dority & Manning, P.A.

(57) ABSTRACT

A system for controlling the operation of an agricultural implement includes a disk blade configured to rotate relative to soil in a field across which the agricultural implement is traveling. Furthermore, the system includes an imaging device configured to generate image data depicting a portion of the field positioned forward of the disk blade. Additionally, a computing system is configured to analyze the image data generated by the imaging device to identify one or more corn stalks that have been severed from a corresponding root ball and are present on a surface of the imaged portion of the field. Moreover, the computing system is configured to determine a length parameter associated with the identified one or more corn stalks. In addition, the computing system is configured to control an operating parameter of the disk blade based on the determined length parameter.

11 Claims, 7 Drawing Sheets

(56)           References Cited

U.S. PATENT DOCUMENTS

| | | | | |
|---|---|---|---|---|
| 2016/0029561 A1* | 2/2016 | Fischer | .................. | B02C 11/00 |
| | | | | 460/25 |
| 2017/0112043 A1* | 4/2017 | Nair | ....................... | A01B 33/16 |
| 2021/0015039 A1 | 1/2021 | Vandike et al. | | |
| 2021/0015045 A1 | 1/2021 | Vandike et al. | | |
| 2021/0034867 A1 | 2/2021 | Ferrari et al. | | |
| 2021/0123728 A1* | 4/2021 | Smith | ................... | A01B 15/16 |
| 2021/0137006 A1 | 5/2021 | Shearer et al. | | |
| 2021/0259148 A1 | 8/2021 | Schmidt | | |
| 2021/0289701 A1 | 9/2021 | White et al. | | |
| 2021/0307228 A1 | 10/2021 | Egelund et al. | | |
| 2022/0110262 A1 | 4/2022 | Vandike et al. | | |
| 2022/0117158 A1* | 4/2022 | Lamprecht | ............. | A01B 79/02 |
| 2022/0377978 A1* | 12/2022 | Laugen | .................. | A01D 63/00 |

FOREIGN PATENT DOCUMENTS

| | | | | | |
|---|---|---|---|---|---|
| CN | 109937685 A | 6/2019 | | | |
| DE | 102019119290 A1 | 1/2021 | | | |
| EP | 2654141 A1 | 3/1988 | | | |
| EP | 2452550 A1 * | 5/2012 | ........... | A01D 43/085 |
| EP | 3981232 A1 | 4/2022 | | | |
| WO | WO 2017/049186 A1 | 3/2017 | | | |

* cited by examiner

200

202 — Receive image data

204 — Identify residue pieces

206 — Classify residue pieces

208 — Determine lengths of residue classified as corn stalks

210 — Disregard residue classified as leaves

212 — Determine length parameter(s)

214 — Generate field map

216 — Control operating parameter(s)

300

302

Receive image data depicting a portion of a field positioned forward of a disk blade of an agricultural implement relative to a travel direction of the agricultural implement

304

Analyze the received image data to identify one or more corn stalks that have been severed from a corresponding root ball and are present on the surface of the imaged portion of the field

306

Determine a length parameter associated with the identified one or more corn stalks

308

Control an operating parameter of the disk blade based on the determined length parameter

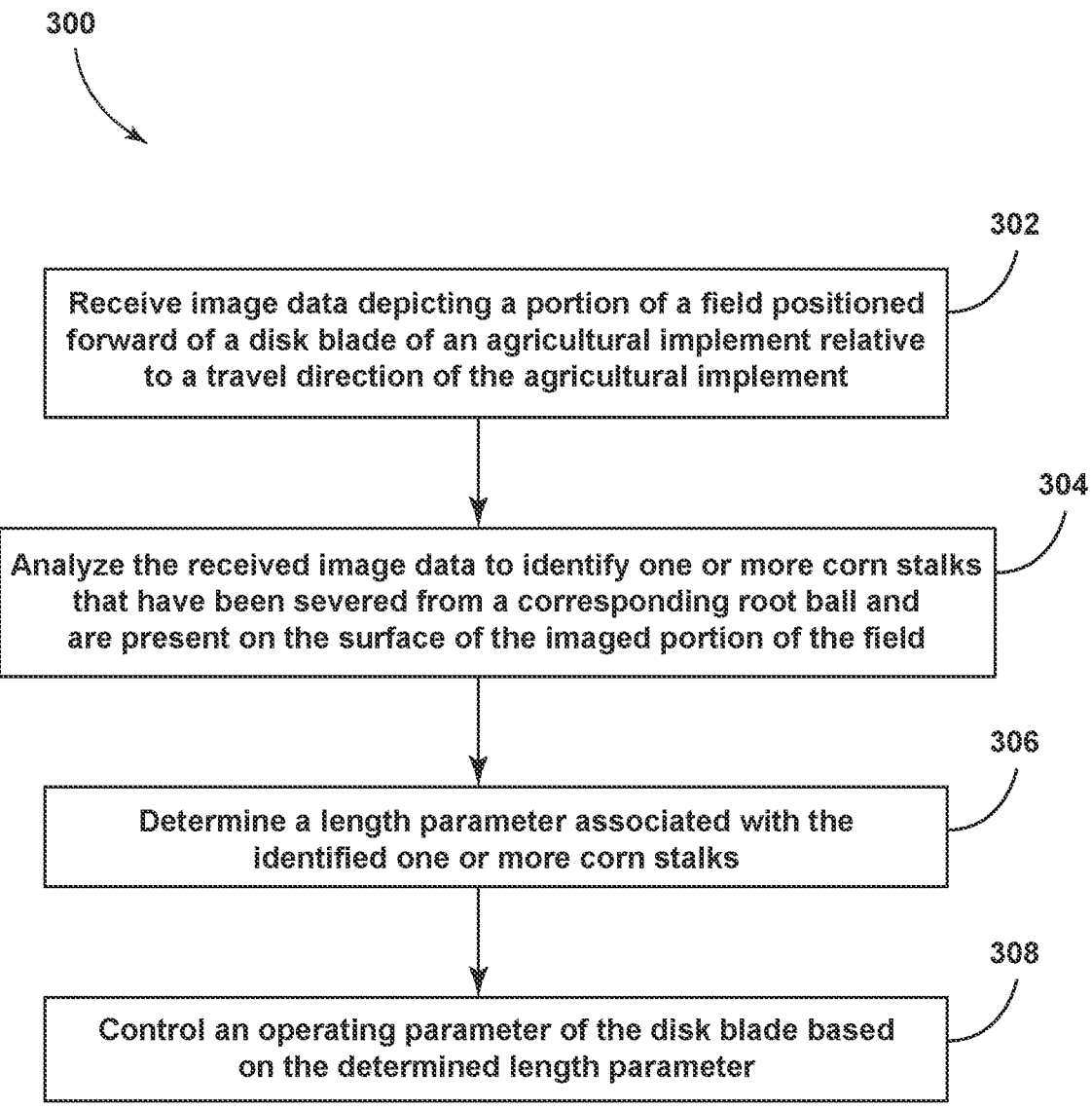

FIG. 7

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to systems and methods for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement, such as a tillage implement, behind an agricultural work vehicle, such as a tractor. For example, tillage implements generally include ground-engaging tillage tools, such as shanks, disk blades, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

As the agricultural implement travels across the field, the implement may encounter varying field conditions. For example, the size, type, and/or amount of residue present on the surface of the field may vary. In this respect, systems for controlling or otherwise adjusting the operation of an agricultural implement during an agricultural operation have been developed. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a disk blade supported on the frame, with the disk blade configured to rotate relative to soil in a field across which the agricultural implement is traveling. Furthermore, the agricultural implement includes an imaging device configured to generate image data depicting a portion of the field positioned forward of the disk blade relative to a travel direction of the agricultural implement. Additionally, the agricultural implement includes a computing system communicatively coupled to the imaging device. In this respect, the computing system is configured to analyze the image data generated by the imaging device to identify one or more corn stalks that have been severed from a corresponding root ball and are present on a surface of the imaged portion of the field. Moreover, the computing system is configured to determine a length parameter associated with the identified one or more corn stalks. In addition, the computing system is configured to control an operating parameter of the disk blade based on the determined length parameter.

In another aspect, the present subject matter is directed to a system for controlling an operation of an agricultural implement. The system includes a disk blade configured to rotate relative to soil in a field across which the agricultural implement is traveling. Furthermore, the system includes an imaging device configured to generate image data depicting a portion of the field positioned forward of the disk blade relative to a travel direction of the agricultural implement. Additionally, the system includes a computing system communicatively coupled to the imaging device. As such, the computing system is configured to analyze the image data generated by the imaging device to identify one or more corn stalks that have been severed from a corresponding root ball and are present on a surface of the imaged portion of the field. Moreover, the computing system is configured to determine a length parameter associated with the identified one or more corn stalks. In addition, the computing system is configured to control an operating parameter of the disk blade based on the determined length parameter.

In a further aspect, the present subject matter is directed to a method for controlling an operation of an agricultural implement. The agricultural implement, in turn, includes a disk blade configured to rotate relative to soil in a field across which the tillage implement is traveling. The method includes receiving, with a computing system, image data depicting a portion of the field positioned forward of the disk blade relative to a travel direction of the agricultural implement. Furthermore, the method includes analyzing, with the computing system, the received image data to identify one or more corn stalks that have been severed from a corresponding root ball and are present on a surface of the imaged portion of the field. Additionally, the method includes determining, with the computing system, a length parameter associated with the identified one or more corn stalks. Moreover, the method includes controlling, with the computing system, an operating parameter of the disk blade based on the determined length parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 7 illustrates a flow diagram of one embodiment of a method for controlling the operation of an agricultural implement in accordance with aspects of the present subject matter.

Figure 1:
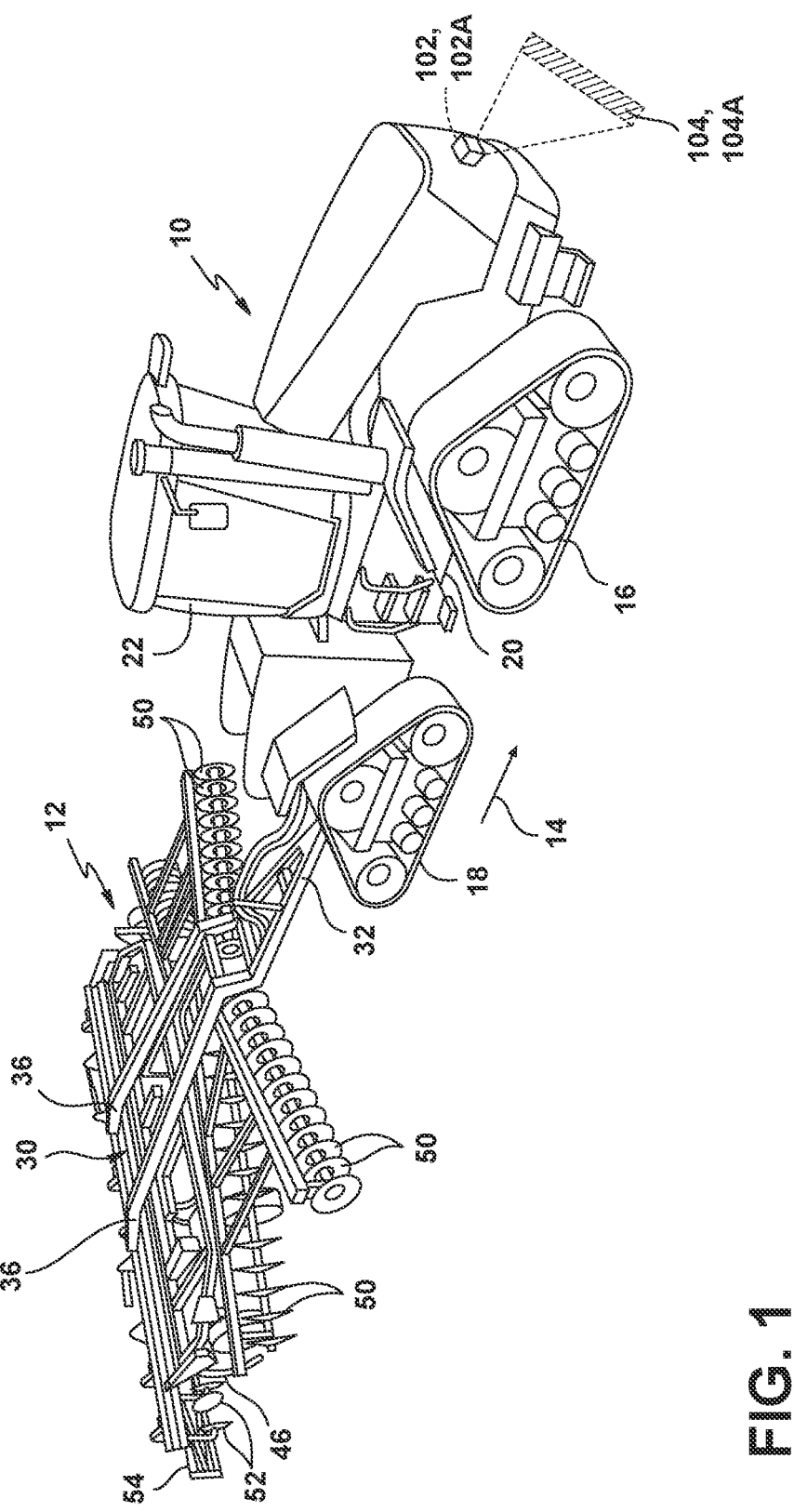
FIG. 1 illustrates a perspective view of one embodiment of a work vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement, such as a tillage implement or a seed-planting implement. As will be described below, the agricultural implement includes one or more disk blades. Each disk blade is, in turn, configured to rotate relative to the soil in the field across which the agricultural implement is traveling. For example, in some embodiments, the disk blade(s) may be configured to cut and size the residue present on the surface of the field.

In several embodiments, a computing system of the disclosed system is configured to control the operation of the disk blade(s) based on the corn stalks present on the surface of the field. More specifically, the computing system is configured to receive image data depicting a portion(s) of the field positioned forward of the disk blade(s). Furthermore, the computing system is configured to analyze the received image data to identify corn stalks that have been severed from their root balls and are present on the surface of the imaged portion(s) of the field. Additionally, the computing system is configured to determine a length parameter(s) associated with the identified corn stalks, such as the average length of and/or the distribution of the lengths of the corn stalks. For example, in some embodiments, the computing system may identify pieces of residue present on the surface of the imaged portion(s) of the field and classify each identified piece as a corn stalk or a non-corn stalk (e.g., a leaf, straw, etc.). Thereafter, in such embodiments, the computing system may determine the length of each residue piece classified as a corn stalk and disregard or otherwise filter out each residue piece classified as a non-corn stalk. The determined lengths can then be used to calculate the length parameter(s). Moreover, the computing system is configured to control one or more operating parameters of the disk blade(s) based on the determined length parameter(s). Such operating parameter(s) may, in turn, include the force(s) being applied to the disk blade(s), the penetration depth(s) of the disk blade(s), and/or the position(s) of the disk blade(s) relative to the frame of the implement.

Controlling the operation of the disk blades of an agricultural implement based on the lengths of the corn stalks that have been severed from their root balls and present on the surface of the field improves the operation of the implement. More specifically, unlike many other types of residue, such as leaves, straw (e.g., wheat straw), stubble, and/or the like, long corn stalks that have been severed from their root balls and are present on the surface of the field are particularly prone to interfering with the operation of the disk blades. For example, such long corn stalks can become wrapped around hangers (e.g., C-hangers), disk gang shafts, and other components or tools of the implement in a manner that can slow or prevent rotation of the associated disk blades. In this respect, and as described above, the disclosed system and method can adjust the operating parameters of the disk blades based on the lengths of the corn stalks present within the field. Such adjustments, in turn, can reduce the lengths of the corn stalks and, thus, the likelihood that the corn stalks interfere with the operation of the disk blades.

Figure 2:
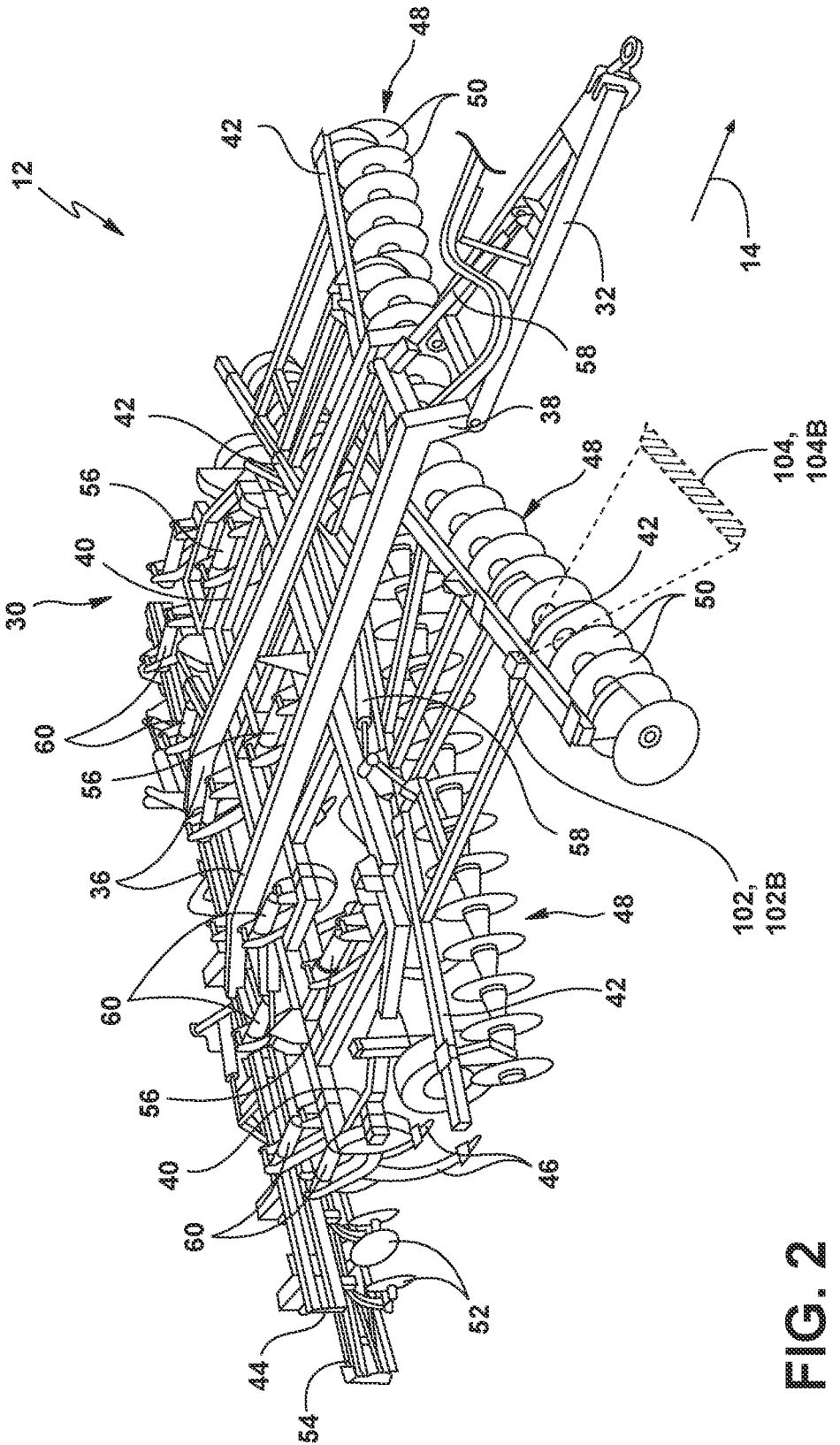
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 14). Additionally, FIG. 2 illustrates a perspective view of the agricultural implement 12 shown in FIG. 1.

As shown, in the illustrated embodiment, the work vehicle 10 is configured as an agricultural tractor and the agricultural implement 12 is configured as a tillage implement (e.g., a disk ripper). However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle, such as a seed-planting implement (e.g., a seeder, a planter, a side dresser, etc.).

As particularly shown in FIG. 1, the work vehicle 10 includes a pair of front track assemblies 16, a pair or rear track assemblies 18, and a frame or chassis 20 coupled to and supported by the track assemblies 16, 18. However, in other embodiments, the work vehicle 10 may include wheels and tires (not shown) in addition to or in lieu of the track assemblies. An operator's cab 22 may be supported by a portion of the chassis 20 and may house various input devices for permitting an operator to control the operation of one or more components of the work vehicle 10 and/or one or more components of the implement 12.

Additionally, as shown in FIGS. 1 and 2, the implement 12 may generally include a carriage frame assembly 30 configured to be towed by the work vehicle 10 via a pull hitch or tow bar 32 in the travel direction 14 of the vehicle/implement 10/12. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform an agricultural operation, such as a tillage operation or any other suitable ground-engaging operation, across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to the travel direction 14 of the vehicle/implement 10/12, and an aft frame 44 positioned aft of the central frame 40 relative to the travel direction 14 of the vehicle/implement 10/12. As shown, in one embodiment, the central frame 40 may correspond to a shank frame configured to support a plurality of ground-engaging shanks 46. In such an embodiment, the shanks 46 are configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. Specifically, the disk blades 50 are spaced apart from each other along the length of the disk gang 48 and configured to rotate relative to the soil within the field as the agricultural implement 12 travels across the field in the travel direction 14. Furthermore, each disk blade 50 may include both a concave side (not shown) and a convex side (not shown). In addition, the various gangs 48 of disk blades 50 may be oriented at an angle relative to the travel direction 14 of the vehicle/implement 10/12 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality of closing disk blades.

In addition, the implement 12 may also include any number of suitable ground-engaging tool actuators (e.g., hydraulic cylinders, electric linear actuators, etc.) for adjusting the relative positioning of, the penetration depth of, and/or the force being applied to the various ground-engaging tools 46, 50, 52, 54. For instance, the implement 12 may include one or more actuators 56 coupled to the central frame 40 for raising and/or lowering the central frame 40 relative to the ground, thereby allowing the penetration depth of and/or the force being applied to the shanks 46 to be adjusted. Similarly, the implement 12 may include one or more actuators 58 coupled to the forward frame 42 to adjust the positioning relative to the carriage frame 30 of, the penetration depth of, and/or the force being applied to the disk blades 50. Moreover, the implement 12 may include one or more actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

Moreover, the work vehicle 10 and/or the agricultural implement 12 may include one or more imaging devices 102 coupled thereto and/or supported thereon. More specifically, the imaging device(s) 102 is configured to generate image data depicting a portion of the field present within its field of view 104 as the vehicle/implement 10/12 moves across the field in the travel direction 14. As will be described below, the image data generated by the imaging device(s) 102 is analyzed to identify the lengths of the corn stalks depicted therein. Such length data is subsequently used in controlling one or more operating parameters of the disk blades 50 of the of the agricultural implement 12.

In general, the imaging device(s) 102 may correspond to any suitable sensing devices configured to generate image data or image-like data depicting the surface of the field. Specifically, in several embodiments, the imaging device(s) 102 may correspond to a suitable camera(s) configured to capture images of the soil surface of the field present within the field of view 104, thereby allowing the lengths of the corn stalks present on the surface of the field to be determined by analyzing the content of each image. For instance, in a particular embodiment, each imaging device(s) 102 may correspond to a stereographic camera(s) having two or more lenses with a separate image sensor for each lens to allow the cameras to capture stereographic or three-dimensional images. Alternatively, the imaging device(s) 102 may correspond to any other suitable devices for generating image data or image-like data, such as a monocular camera(s), a LiDAR device(s), a RADAR device(s), and/or the like.

The imaging device(s) 102 may be mounted at any suitable location(s) on the work vehicle 10 and/or the agricultural implement 12 that allows the imaging device(s) 102 to generate image data depicting a portion(s) of the field forward of the disk blades 50 of the implement 12 relative to the travel direction 14. For example, in the illustrated embodiment, a first imaging device 102A is mounted on the forward end of the work vehicle 10 such that the first imaging device 102A has a field of view 104A directed at a portion of the field forward of the vehicle 10. Furthermore, in the illustrated embodiment, a second imaging device 102B is mounted on the forward end of the implement 12 (e.g., on the forward frame 42) such that the second imaging device 102B has a field of view 104B directed at a portion of the field forward of the implement 12. However, in alternative embodiments, include any other suitable number of imaging devices 102 and/or such imaging device(s) 102 may be mounted at any other suitable location(s), such as at the forward end of the carriage frame assembly 30.

Figure 3:
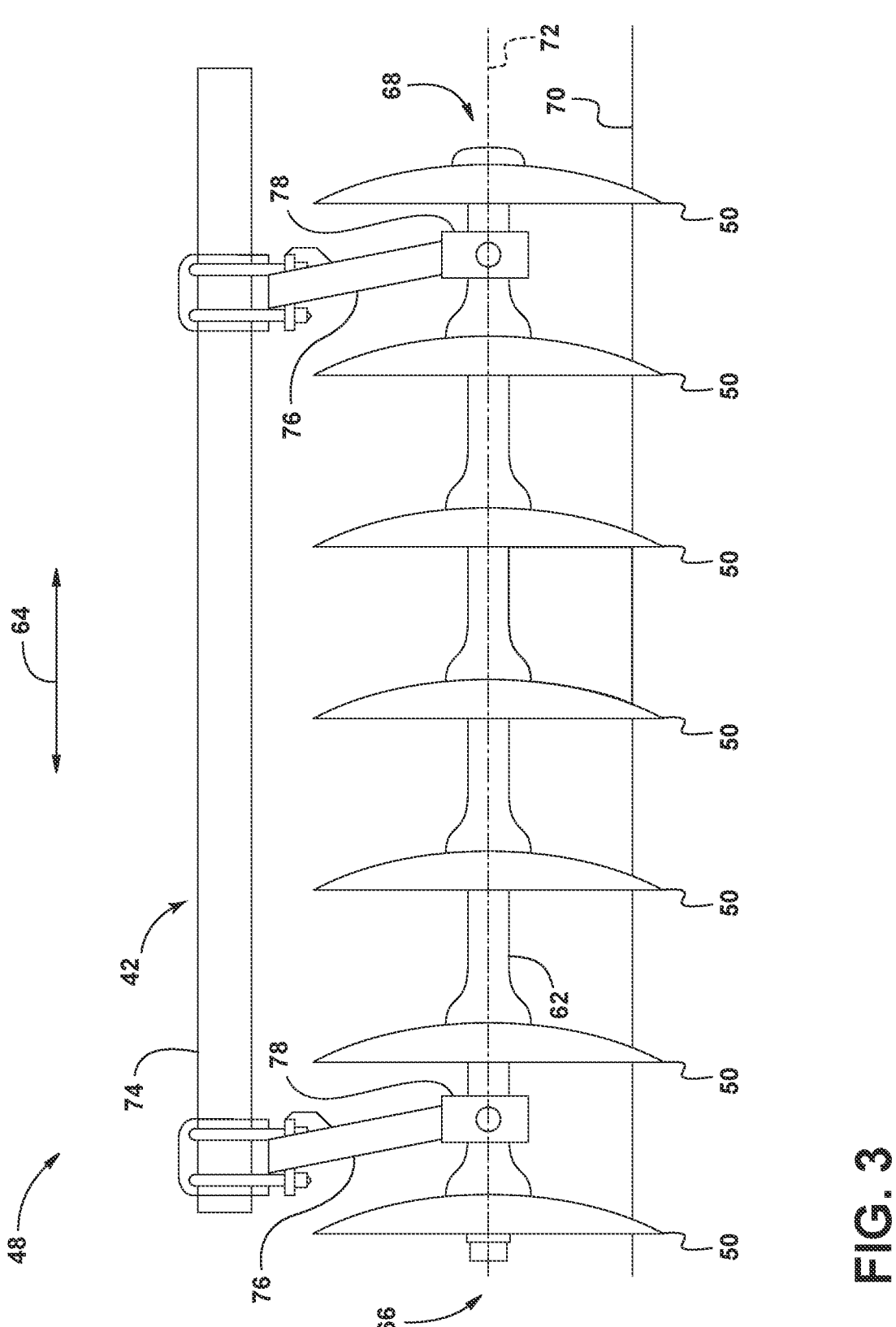
FIG. 3 illustrates a front view of one embodiment of a disk gang of an agricultural implement in accordance with aspects of the present subject matter.

Referring now to FIG. 3, a front view of one embodiment of one of the disk gangs 48 of the implement 12 is illustrated in accordance with aspects of the present subject matter. Specifically, in several embodiments, the disk gang 48 may include a disk gang shaft 62 that extends along an axial direction or length of the disk gang 48 (e.g., as indicated by arrow 64 in FIG. 3) between a first end 66 and a second end 68. As shown, the disk blades 50 are coupled to the disk gang shaft 62 and spaced apart from each other along the axial direction 64. As the implement 12 travels across a field, the disk blades 50 penetrate the soil surface (e.g., as indicated by line 70 in FIG. 3) of the field and rotate about an axis of rotation (e.g., as indicated by dashed line 72 in FIG. 3) relative to the soil within the field.

In general, the disk gang 48 is supported relative to a corresponding support arm 74 of the forward frame 42 of the agricultural implement 10. Specifically, in several embodiments, a pair of hangers 76 (e.g., C-hangers) support the disk gang 48 at a position below the support arm 74. For example, in one embodiment, one end of each hanger 76 may be coupled to the support arm 74, while the opposing end of each hanger 76 is coupled to a bearing block 78. The bearing blocks 78, in turn, are rotatably coupled to the disk gang shaft 56. However, in alternative embodiments, the disk gang 48 may have any other suitable configuration.

The configuration of the work vehicle 10 and the agricultural implement 12 described above and shown in FIGS. 1-3 is provided only to place the present subject matter in an exemplary field of use. Thus, the present subject matter may be readily adaptable to any manner of work vehicle and/or agricultural implement configuration.

Figure 4:
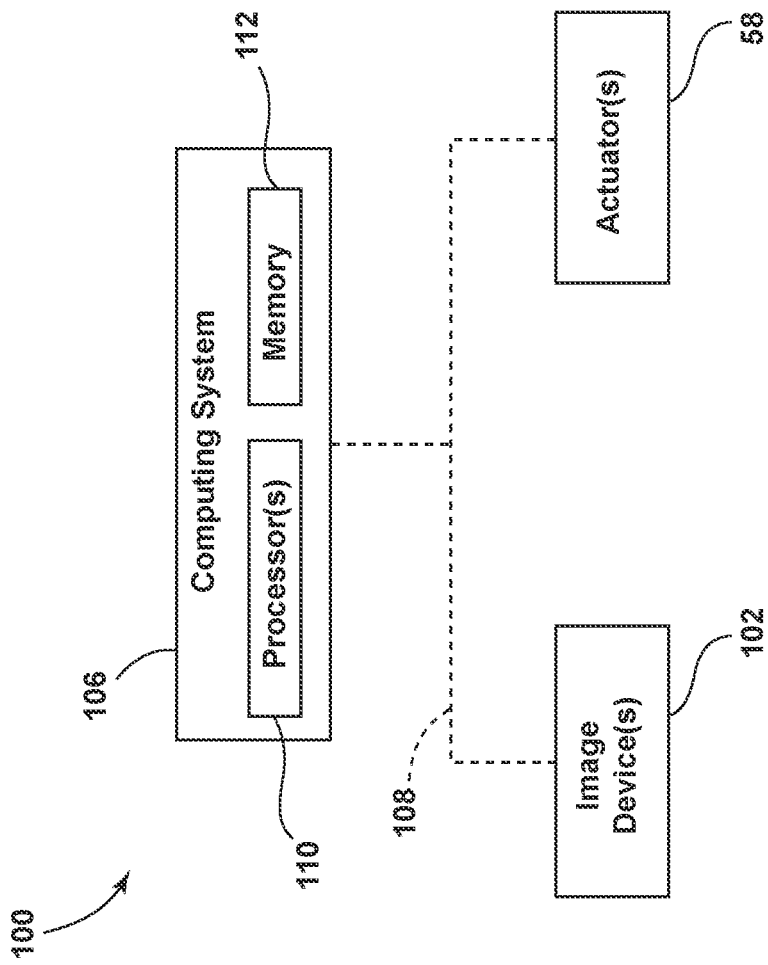
FIG. 4 illustrates a schematic view of one embodiment of a system for controlling the operation of an agricultural implement in accordance with aspects of the present subject matter.

Referring now to FIG. 4, a schematic view of one embodiment of a system 100 for controlling the operation of an agricultural implement is illustrated in accordance with aspects of the present subject matter. In general, the system 100 will be described herein with reference to the work vehicle 10 and the agricultural implement 12 described above with reference to FIGS. 1-3. However, it should be appreciated by those of ordinary skill in the art that the disclosed system 100 may generally be utilized with work vehicles having any other suitable vehicle configuration and/or agricultural implements having any other suitable implement configuration.

As shown in FIG. 4, the system 100 includes a computing system 106 communicatively coupled to one or more components of the work vehicle 10, the agricultural implement 12, and/or the system 100 to allow the operation of such components to be electronically or automatically controlled by the computing system 106. For instance, the computing system 106 may be communicatively coupled to the imaging device(s) 102 via a communicative link 108. As such, the computing system 106 may be configured to receive image data from the imaging device(s) 102 that is indicative of the corns stalks present within the field across which the vehicle/implement 10/12 is traveling. Furthermore, the computing system 106 may be communicatively coupled to the actuator(s) 58 via the communicative link 108. In this respect, the computing system 106 may be configured to control the operation of the actuator(s) 58 to adjust the force being applied to, the penetration depth of, and/or the position relative to the carriage frame 30 of the disk blades 50. In addition, the computing system 106 may be communicatively coupled to any other suitable components of the work vehicle 10, the agricultural implement 12, and/or the system 100. For example, the computing system 106 may be communicatively coupled to the actuators 56, 60 of the agricultural implement 12 via the communicative link 108.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, an implement controller, and/or the like.

Figure 5:
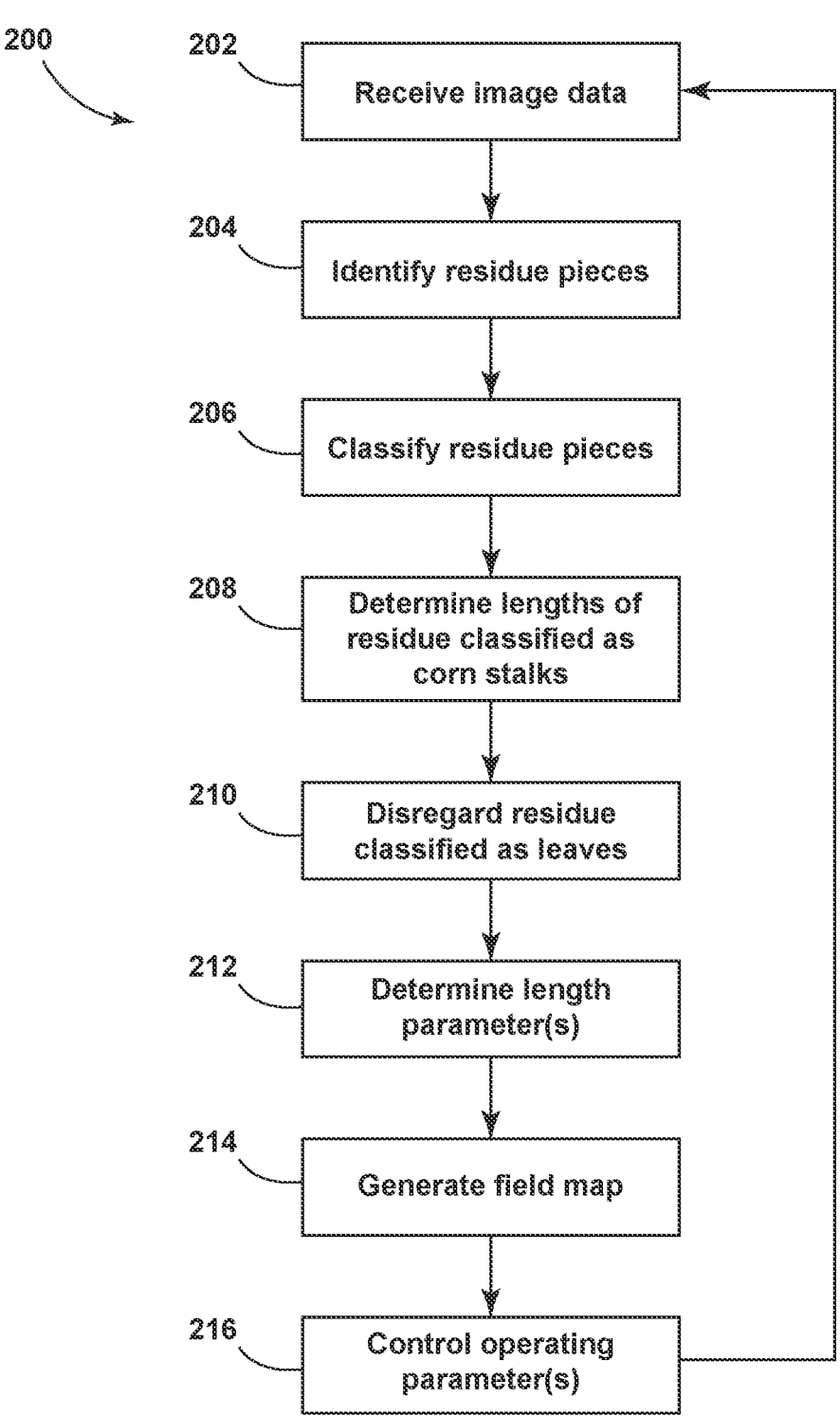
FIG. 5 illustrates a flow diagram providing one embodiment of control logic for controlling the operation of an agricultural implement in accordance with aspects of the present subject matter.

Referring now to FIG. 5, a flow diagram of one embodiment of control logic 200 that may be executed by the computing system 106 (or any other suitable computing system) for controlling the operation of an agricultural implement is illustrated in accordance with aspects of the present subject matter. Specifically, the control logic 200 shown in FIG. 5 is representative of steps of one embodiment of an algorithm that can be executed to control the operation of an agricultural implement in a manner that minimizes the number of corn stalks that wrap around components of the implement and interfere with the operation of the disk blades on the implement. Thus, in several embodiments, the control logic 200 may be advantageously utilized in association with a system installed on or forming part of a work vehicle and/or an agricultural implement to allow for real-time control of the agricultural implement without requiring substantial computing resources and/or processing time. However, in other embodiments, the control logic 200 may be used in association with any other suitable system, application, and/or the like for controlling the operation of an agricultural implement.

As shown, at (202), the control logic 200 includes receiving image data depicting a portion of a field across which an agricultural implement is traveling. Specifically, as mentioned above, in several embodiments, the computing system 106 is communicatively coupled to the imaging device(s) 102 via the communicative link 108. In this respect, as the agricultural implement 12 travels across the field to perform an agricultural operation (e.g., a tillage operation) thereon, the computing system 106 may receive image data from the imaging device(s) 102. Such image data, in turn, depicts the corn stalks and other residue pieces present on the surface of the imaged portion(s) of the field. As will be described below, the received image data is then analyzed to identify one or more corn stalks that have been severed from a corresponding root ball and are present on a surface of the imaged portion(s) of the field.

Furthermore, at (204), the control logic 200 includes identifying one or more pieces of residue present on the surface of the imaged portion of the field. Specifically, in several embodiments, the computing system 106 is configured to analyze the image data received at (202) to identify residue pieces present within the imaged portion(s) of the field depicted in the received image data. For example, the computing system 106 may use any suitable image processing algorithms or techniques to identify the residue pieces, such as color-based image processing algorithms, texture-based image processing algorithms, and/or the like.

Additionally, at (206), the control logic 200 includes classifying each of the identified one or more pieces of residue as having one of a corn stalk classification or a non-corn stalk classification. Specifically, in several embodiments, the computing system 106 is configured to analyze each piece of residue identified at (204) and classify such piece of residue as having a corn stalk classification or a non-corn stalk classification. In general, residue pieces having a corn stalk classification are corn stalks that have been severed from their root balls, while residue pieces having a non-corn stalk classification are leaves, straw, stubble, and/or other non-corn stalk residue pieces. In one embodiment, the computing system 106 may use the shape of each identified piece of residue to determine its classification. However, in other embodiments, the computing system 106 may determine the classifications of the residue pieces in any other suitable manner.

Figure 6:
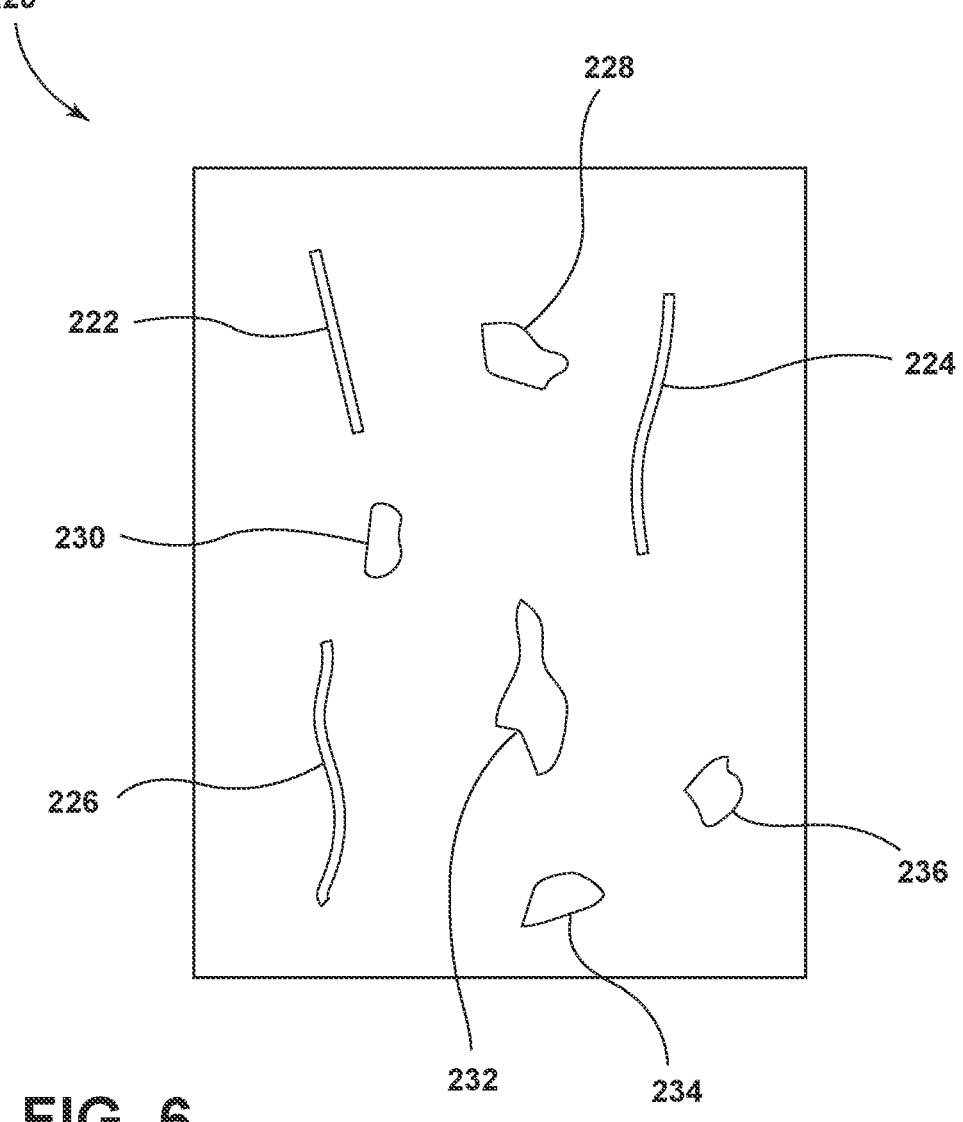
FIG. 6 illustrates an example view of an imaged portion of a field in accordance with aspects of the present subject matter, particularly illustrating pieces of residue being classified as a corn stalk or a non-corn stalk.

FIG. 6 illustrates an example view of an imaged portion of a field 220. In the example view, several pieces of residue, namely residue pieces 222, 224, 226, 228, 230, 232, 234, 236, have been identified in the imaged portion of the field 220. In general, corn stalks that have been severed from their root balls have a much greater length to width or aspect ratio than leaves, straw; stubble, and other types of residue. As shown, the residue pieces 222, 224, 226 have a much greater aspect ratio than the residue pieces 228, 230, 232, 236. In this respect, the computing system 106 may classify the residue pieces 222, 224, 226 as having a corn stalk classification and the residue pieces 228, 230, 232, 236 as having a non-corn stalk classification.

Referring again to FIG. 5, at (208), the control logic 200 includes determining the length of each identified piece of residue having the corn stalk classification. Specifically, in several embodiments, the computing system 106 is configured to analyze each residue piece determined to have a corn stalk classification at (206) to determine its length. As used herein, the length of a residue piece corresponds to its longest dimension. Conversely, the width of a residue piece corresponds to the dimension perpendicular to its length. As will be described below, the determined lengths of the pieces of residue having the corn stalk classification are used to determine one or more length parameters associated with the imaged portion(s) of the field.

Moreover, at (210), the control logic 200 includes disregarding each piece of residue having the non-corn stalk classification. Specifically, in several embodiments, the computing system 106 is configured to disregard each piece of residue determined to have the non-corn stalk classification at (206). As mentioned above, such residue pieces having a non-corn stalk classification are leaves, straw, stubble, and like. These types of residue, in turn, are unlikely to wrap around components of the agricultural implement 12, such as the disk gang shafts 56, the hangers 76, and/or the like. Thus, these pieces of residue can be ignored.

In addition, at (212), the control logic 200 includes determining a length parameter associated with the identified one or more corn stalks. Specifically, in several embodiments, the computing system 106 is configured to determine one or more length parameters associated with the identified corn stalks (e.g., the residue pieces having a corn stalk classification at (206)) present within the imaged portion(s) of the field based on the lengths determined at (208). As will be described below, the determined length parameter(s) is used to control the operation of the disk blades 50 to reduce the likelihood that the corn stalks will wrap around the disk gang shafts 56, the hangers 76, and/or components of the implement 12.

Any suitable length-based parameter(s) may be determined at (212). For example, in one embodiment, the length-based parameter(s) may include the average length of the identified corn stalks in an imaged portion of the field. Additionally, or alternatively, the length-based parameter(s) may include a distribution of the lengths of the identified corn stalks present in an imaged portion of the field (e.g., the number identified corn stalks having lengths within different size ranges). However, any other suitable length-based parameter(s) may be determined at (212).

Furthermore, at (214), the control logic 200 includes generating a field map identifying the determined length parameter at one or more locations within the field. Specifically, in several embodiments, the computing system 106 may generate a field map identifying the length parameter(s) associated with the corn stalks determined at (212) at one or more locations within the field. The field map may, in turn, be used in a subsequent agricultural operation (e.g., a subsequent tillage operation, planting operation, a fertilizing operation, etc.)

Additionally, at (216), the control logic 20 includes controlling an operating parameter of the disk blade based on the determined length parameter. Specifically, as mentioned above, in several embodiments, the computing system 106 is communicatively coupled to the actuator(s) 58 via the communicative link 108. In this respect, as the agricultural implement 12 travels across the field to perform the agricultural operation, the computing system 106 may transmit control signals to the actuator(s) 58. The control signals may, in turn, instruct the actuator(s) 58 to adjust one or more operating parameters of the disk blades 50.

Any suitable operating parameter(s) of the disk blades 50 may be adjusted or otherwise controlled at (216). For example, such operating parameter(s) may include the positioning of the disk blades 50 relative to the carriage frame 30, the penetration depth(s) of the disk blades 50, and/or the force(s) being applied to the disk blades 50.

Such operating parameter adjustments may reduce the lengths of the corn stalks present within the field, thereby reducing the likelihood that the corn stalks wrap around the disk gang shafts 56, the hangers 76, and/or components of the implement 12. For example, when a large portion of the identified corn stalks have long lengths, the forces being applied to the disk blades 50 may be increased to cut the residue (and the corn stalks) into smaller pieces. Conversely, when a large portion of the identified corn stalks have short lengths, the forces being applied to the disk blades 50 may be reduced.

Referring now to FIG. 7, a flow diagram of one embodiment of a method 300 for controlling the operation of an agricultural implement is illustrated in accordance with aspects of the present subject matter. In general, the method 300 will be described herein with reference to the work vehicle 10, the agricultural implement 12, and the system 100 described above with reference to FIGS. 1-6. However, it should be appreciated by those of ordinary skill in the art that the disclosed method 300 may generally be implemented with any work vehicle having any suitable vehicle configuration, any agricultural implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, image data depicting a portion of a field positioned forward of a disk blade of an agricultural implement relative to a travel direction of the agricultural implement. For instance, as described above, the computing system 106 may be configured to receive image data from the imaging device(s) 102. Such image data, in turn, depicts one or more portions of a field positioned forward of the disk blades 50 relative to the travel direction 14 of the agricultural implement 12.

Furthermore, at (304), the method 300 includes analyzing, with the computing system, the received image data to identify one or more corn stalks that have been severed from a corresponding root ball and are present on the surface of the imaged portion of the field. For instance, as described above, the computing system 106 may be configured to analyze the received image data to identify one or more corn stalks that have been severed from a corresponding root ball and are present on the surface of the imaged portion(s) of the field.

Additionally, at (306), the method 300 includes determining, with the computing system, a length parameter associated with the identified one or more corn stalks. For instance, as described above, the computing system 106 may be configured to determine one or more length parameters associated with the identified corn stalks (e.g., the average length, a length distribution, etc.).

Moreover, at (308), the method 300 includes controlling, with the computing system, an operating parameter of the disk blade based on the determined length parameter. For instance, as described above, the computing system 106 may be configured to control one or more operating parameters of the disk blade 50 based on the determined length parameter(s). Such operating parameter(s) may, in turn, include the forces being applied to the disk blades 50, the penetration depths of the disk blades 50, and/or the positions of the disk blades 50 relative to the carriage frame 30.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a disk blade supported on the frame, the disk blade configured to rotate relative to soil in a field across which the agricultural implement is traveling;
   an imaging device configured to generate image data depicting a portion of the field positioned forward of the disk blade relative to a travel direction of the agricultural implement; and
   a computing system communicatively coupled to the imaging device, wherein the computing system:
   analyzes the image data generated by the imaging device to identify one or more pieces of residue present on a surface of the imaged portion of the field;
   classifies each of the identified one or more pieces of residue as having one of a corn stalk classification or a non-corn stalk classification, the corn stalk classification being indicative of a corn stalk that has been severed from a corresponding root ball and is present on the surface of the field;
   determines a length of each identified piece of residue having the corn stalk classification;
   disregards each piece of residue having the non-corn stalk classification;
   determines a length parameter associated with the one or more residue pieces having the corn stalk classification based on the determined lengths; and
   controls an operating parameter of the disk blade based on the determined length parameter.

2. The agricultural implement of claim 1, wherein the operating parameter comprises at least one of a force being applied to the disk blade, a penetration depth of the disk blade, or a position of the disk blade relative to the frame.

3. A system for controlling an operation of an agricultural implement, the system comprising:
   a disk blade configured to rotate relative to soil in a field across which the agricultural implement is traveling;
   an imaging device configured to generate image data depicting a portion of the field positioned forward of the disk blade relative to a travel direction of the agricultural implement; and
   a computing system communicatively coupled to the imaging device, wherein the computing system:
   analyzes the image data generated by the imaging device to identify one or more pieces of residue present on a surface of the imaged portion of the field;
   classifies each of the identified one or more pieces of residue as having one of a corn stalk classification or a non-corn stalk classification, the corn stalk classification being indicative of a corn stalk that has been severed from a corresponding root ball and is present on the surface of the field;

determines a length of each identified piece of residue having the corn stalk classification;

disregards each piece of residue having the non-corn stalk classification;

determines a length parameter associated with the identified one or more residue pieces having the corn stalk classification based on the determined lengths; and controls an operating parameter of the disk blade based on the determined length parameter.

4. The system of claim 3, wherein the length parameter comprises an average length of the determined lengths.

5. The system of claim 3, wherein the length parameter comprises a length distribution of the determined lengths.

6. The system of claim 3, wherein the operating parameter comprises at least one of a force being applied to the disk blade, a penetration depth of the disk blade, or a position of the disk blade relative to a frame of the agricultural implement.

7. The system of claim 3, wherein the computing system generates a field map identifying the determined length parameter at one or more locations within the field.

8. A method for controlling an operation of an agricultural implement, the agricultural implement including a disk blade configured to rotate relative to soil in a field across which the tillage implement is traveling, the method comprising:

receiving, with a computing system, image data depicting a portion of the field positioned forward of the disk blade relative to a travel direction of the agricultural implement;

analyzing, with the computing system, the received image data to identify one or more pieces of residue present on a surface of the imaged portion of the field;

classifying, with the computing system, each of the identified one or more pieces of residue as having one of a corn stalk classification or a non-corn stalk classification, the corn stalk classification being indicative of a corn stalk that has been severed from a corresponding root ball and is present on the surface of the field;

determining, with the computing system, a length of each identified piece of residue having the corn stalk classification;

disregarding, with the computing system, each piece of residue having the non-corn stalk classification;

determining, with the computing system, a length parameter associated with the one or more residue pieces having the corn stalk classification based on the determined lengths; and controlling, with the computing system, an operating parameter of the disk blade based on the determined length parameter.

9. The method of claim 8, wherein the length parameter comprises an average length of the determined lengths.

10. The method of claim 8, wherein the length parameter comprises a length distribution of the determined lengths.

11. The method of claim 8, wherein the operating parameter comprises at least one of a force being applied to the disk blade, a penetration depth of the disk blade, or a position of the disk blade relative to a frame of the agricultural implement.

* * * * *